United States Patent [19]

Hayashi et al.

[11] Patent Number: 4,632,525
[45] Date of Patent: Dec. 30, 1986

[54] SIDE-MIRROR DRIVING APPARATUS

[75] Inventors: Mikio Hayashi, Oubu; Kouzi Kawasumi, Nagoya, both of Japan

[73] Assignee: Nippondenso Co., Ltd., Kariya, Japan

[21] Appl. No.: 805,906

[22] Filed: Dec. 6, 1985

[30] Foreign Application Priority Data

Dec. 11, 1984 [JP] Japan .................. 59-262446

[51] Int. Cl.⁴ .................. G02B 7/18; G02B 5/08; A47G 1/24
[52] U.S. Cl. .................. 350/634; 248/481; 248/487; 350/605; 350/637
[58] Field of Search .............. 350/605, 606, 631–637; 248/476, 479, 480, 481, 485–487

[56] References Cited

U.S. PATENT DOCUMENTS

| 3,609,014 | 9/1971 | Kurz, Jr. ................ 350/634 |
| 3,972,597 | 8/1976 | Repay et al. .......... 248/479 X |
| 4,056,253 | 11/1977 | Repay et al. .......... 248/479 |
| 4,108,541 | 8/1978 | Eiratsu .................. 350/636 |
| 4,171,873 | 10/1979 | Repay et al. .......... 248/479 X |
| 4,324,454 | 4/1982 | Kumai .................... 350/634 |
| 4,482,211 | 11/1984 | Fisher .................... 350/637 |
| 4,540,252 | 9/1985 | Hayashi et al. ........ 350/637 X |

FOREIGN PATENT DOCUMENTS 56-23815  6/1981  Japan .

Primary Examiner—John Petrakes
Attorney, Agent, or Firm—Cushman, Darby and Cushman

[57] ABSTRACT

A side mirror driving apparatus for vehicles capable of automatically returning the mirror to its initial position after the mirror is swingably operated up and down and/or right and left to get a wider rear field of view when changing the vehicle's course. The apparatus includes first power transmitting means for adjusting the angle position of the mirror to a desired one and second power transmitting means for temporarily swinging the mirror for the above purpose, the first and second power transmitting means being operatively independent of each other, so that the mirror, when operated, is always inclined downwardly or outwardly from a starting position of the mirror.

6 Claims, 7 Drawing Figures

SIDE-MIRROR DRIVING APPARATUS

BACKGROUND OF THE INVENTION

1. Field of the Invention

The present invention relates to a side-mirror driving apparatus for driving a side-mirror of a motor vehicle by remote control, and in particular to a side-mirror driving apparatus in which the side-mirror is inclined for a predetermined time or by a predetermined angle to confirm an obstacle behind the vehicle in a wide angular range when the vehicle turns to the right or the left, or changes a driving lane or moves back, and the side-mirror is automatically returned to its initial position.

2. Brief Description of Prior Art

Various types of apparatuses controlling side mirrors of a motor vehicle to a desired position by remote control are well known in the art. A side-mirror driving apparatus of a prior publication of a Japanese examined laid open to public application No. 56-23815, for example, makes the side-mirror incline upward and downward and/or right and left by means of a motor, to a position allowing a desired rear field of vision. Problems occur with respect to the foregoing driving apparatus that since the apparatus does not have a function to automatically return the side-mirror to its initial position, it is therefore troublesome and takes much time to return the side-mirror to the exact initial position whilst requiring the driver to keep his eyes on the side-mirror during the operation, thereby being substantially impossible to confirm a wide rear field of view, particularly, when the vehicle is moving.

SUMMARY OF THE INVENTION

In its broadest aspects, it is an object of this invention to provide an efficient side-mirror driving apparatus which neglects troublesome mannual operation by automatically returning the side-mirror to the initial position after the driver has confirmed the rear field of vision.

In order to achieve the foregoing object, the present invention at least comprises a first rotating member rotatably driven by a first electric motor, a second rotating member moved up and down by a linkage mechanism and rotatably supported by a housing, and means automatically stopping rotation of the shaft of the second motor at a predetermined angular position. A lever movably connected at one end to the rear side of the side-mirror is linked with the second rotating member such that the lever is moved up and down by rotating and/or reciprocating motion of the second rotating member, the first rotating member being coupled to the second rotating member in such a manner that rotation of the first rotating member is transmitted to the second one, thereby rotating motion made by the first electric motor and reciprocating motion made by the second electric motor are independently transmitted to the second rotating member, thus automatically returning the side-mirror to its initial position after having inclined the side-mirror to confirm the rear field of vision.

DETAILED DESCRIPTION OF THE PREFERRED EMBODIMENTS

The present invention will be hereinafter described with reference to an embodiment utilizing the attached drawings.

Figure 1:
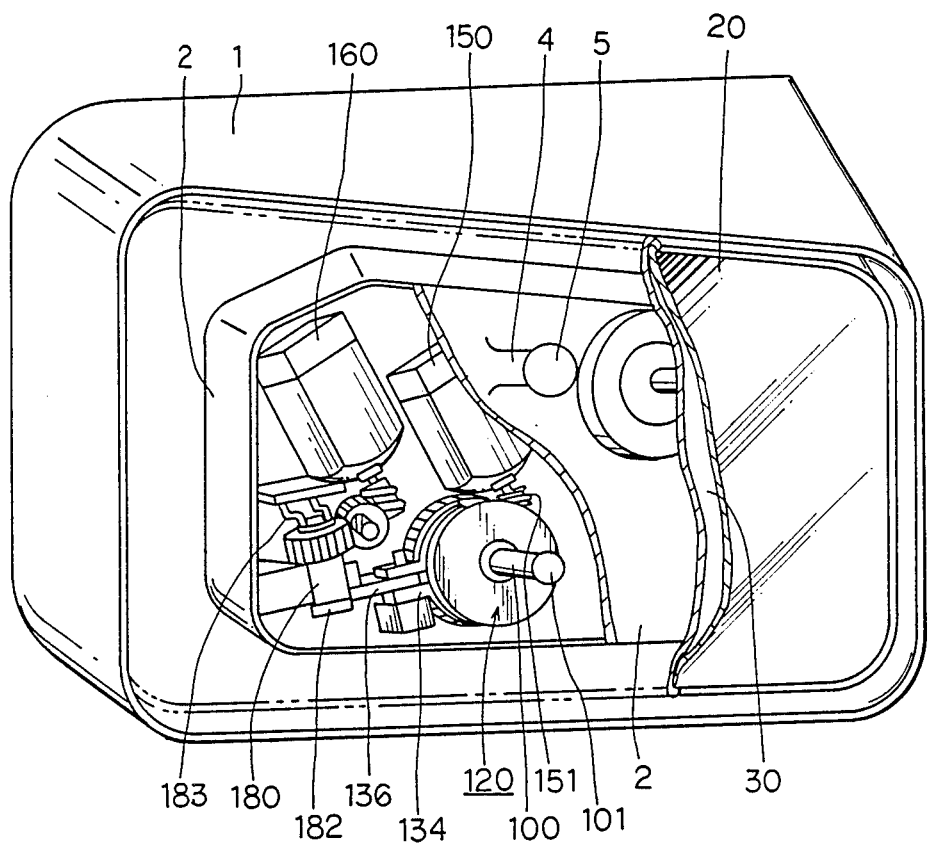
FIG. 1 is a perspective and partly cross-sectional view showing a side-mirror driving apparatus according to the invention.

Referring now to FIG. 1, numeral 1 designates a mirror housing attached to a motor vehicle, and a mirror 20 and a mirror driving apparatus are fixedly secured therein by an appropriate manner. Numerals 2 and 3 designate casings fixed to each other in a well-known manner and constituting one casing to house the mirror driving apparatus therein. Integrally formed on almost center of the casing 2 is a supporting shaft 4 supporting by a ball-joint a center of a rear surface of a supporting plate 30 supporting the mirror 20. The supporting shaft 4 has at its forward end a ball portion 5 engaged in a socket portion 31 on the rear surface of the supporting plate 30. With the construction thus described above, the supporting plate 30 and the mirror 20 are swingably held with respect to the supporting shaft 4 within the housing 1. The mirror 20 has a slight convex surface and secured to the supporting plate 30 in a well-known manner.

Figure 2:
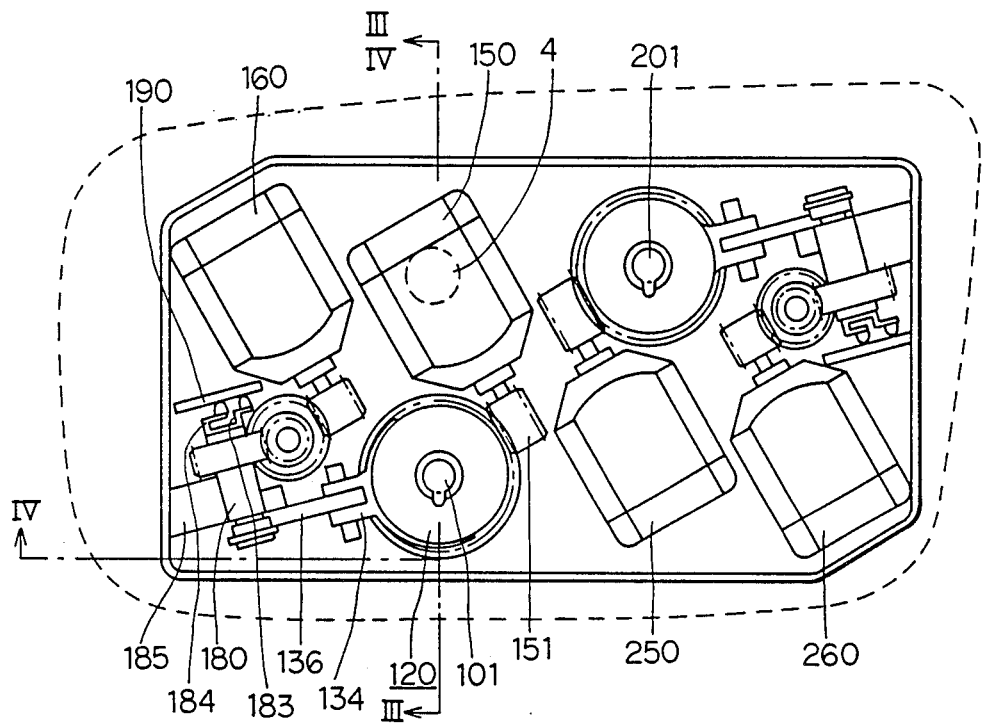
FIG. 2 is a plan view of FIG. 1 but illustrating the same without a side-mirror.

The mirror driving apparatus is, here as an embodiment shown in FIG. 2, composed of a first driving mechanism for inclining the mirror upward and downward and a second driving mechanism for inclining the mirror right and left. In the figure, a ball portion 101 formed at the forward end of a lever 100 of the first driving mechanism is disposed downward with respect to the supporting shaft 4 and another ball portion 201 formed at a lever of the second driving mechanism is disposed right-hand side with respect to the supporting shaft 4, whereby the mirror is inclined upward and downward and/or right and left. The first and second driving mechanism respectively have the same construction and operation so that reference is made below in detail only to the first driving mechanism.

Referring to FIGS. 3 to 6, a first rotating member 110 rotatably supported on the casing 3 includes a circular bottom portion 111 inserted into a bearing portion 6 integrally formed with the casing 3, and at the other end a gear portion 112 meshed with a pinion 151 of an output shaft of a first electric motor 150 so that the first rotating member 110 is rotated by the electric motor 150. There is formed within the first rotating member 110 a quadrate cross sectional through-hall 113 therethrough in the axial direction, to which a corresponding base portion 121 of a second rotating member 120 is inserted. Therefore, although the relative rotational movement of the corresponding base portion 121 is restricted by the first rotating member 110, its reciprocative movement is not restricted. The second rotating member 120 has at one end a circular disc 122 rotatably reciprocately and movably supported by a cup-like bearing 7 formed on the casing 2. Between the circular disc 122 and the base portion 121 there is formed a circular cylinder portion 123 inserted into and engaged with a ring 130, when coupled to the first rotating member 110, in such a manner that the ring 130 is rotatably held on the circumferential surface of the circular cylinder portion 123 by means of restrictive means such as clip 133. The second rotating member 120 further has a bore 124 passing therethrough in the axial direction, to which one end of the lever 100 having threads 103 is inserted. At least one radially, outwardly extending slit 125 is provided that is perpendicular to the axial bore 124. A spring 126 having a pair of parallelly extending pins 127 and 128 is inserted into the slit 125 to engage the threads 103 of the lever 100 in the bore 124. The ball portion 101 of the lever 100 having a projection 102 extending perpendicular to the longitudinal direction of the lever 100 is engaged into a socket portion 32 formed on the rear surface of the supporting plate 30, constituting a ball and socket joint in which there is provided a groove 33 to receive the projection 102, thereby restricting rotation of the lever 100.

With the constructions described above, when the first rotating member 110 is driven by the first motor 150 in either clockwise or counterclockwise direction, the rotational motion is transmitted to the second rotating member 120 through the circumferential connection between the through-hall 113 of the first rotating member 110 and the base portion 121 of the second rotating member 120. At this time, though the spring 126 inserted into and secured at the groove 125 is also rotated in the same direction as the second rotating member 120 rotates, the lever 100 is not able to rotate, but, moves up and down in accordance with the rotational direction of the second rotating member 120. As already described and viewed in FIG. 2 in which the ball portion 101 is disposed downward with respect to the supporting shaft 4, the reciprocative movement of the lever 100 will thus incline the mirror 20 upward and downward with respect to the ball and socket joint. On the other hand, the ring 130 and the circular cylinder portion 123 are disposed in substantially slidable relationship each other, therefore, the rotational motion of the second rotating member 120 exerts no influence over the ring 30 coupled to a second motor 160 through a linking mechanism which will be hereinafter described in detail.

Figure 5:
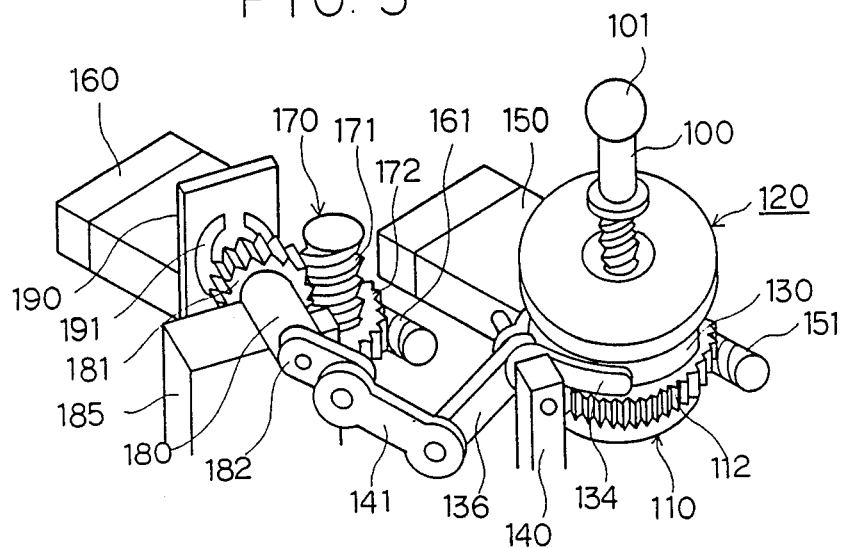
FIG. 5 is a perspective view showing a principal portion of the side-mirror driving apparatus.
Figure 6:
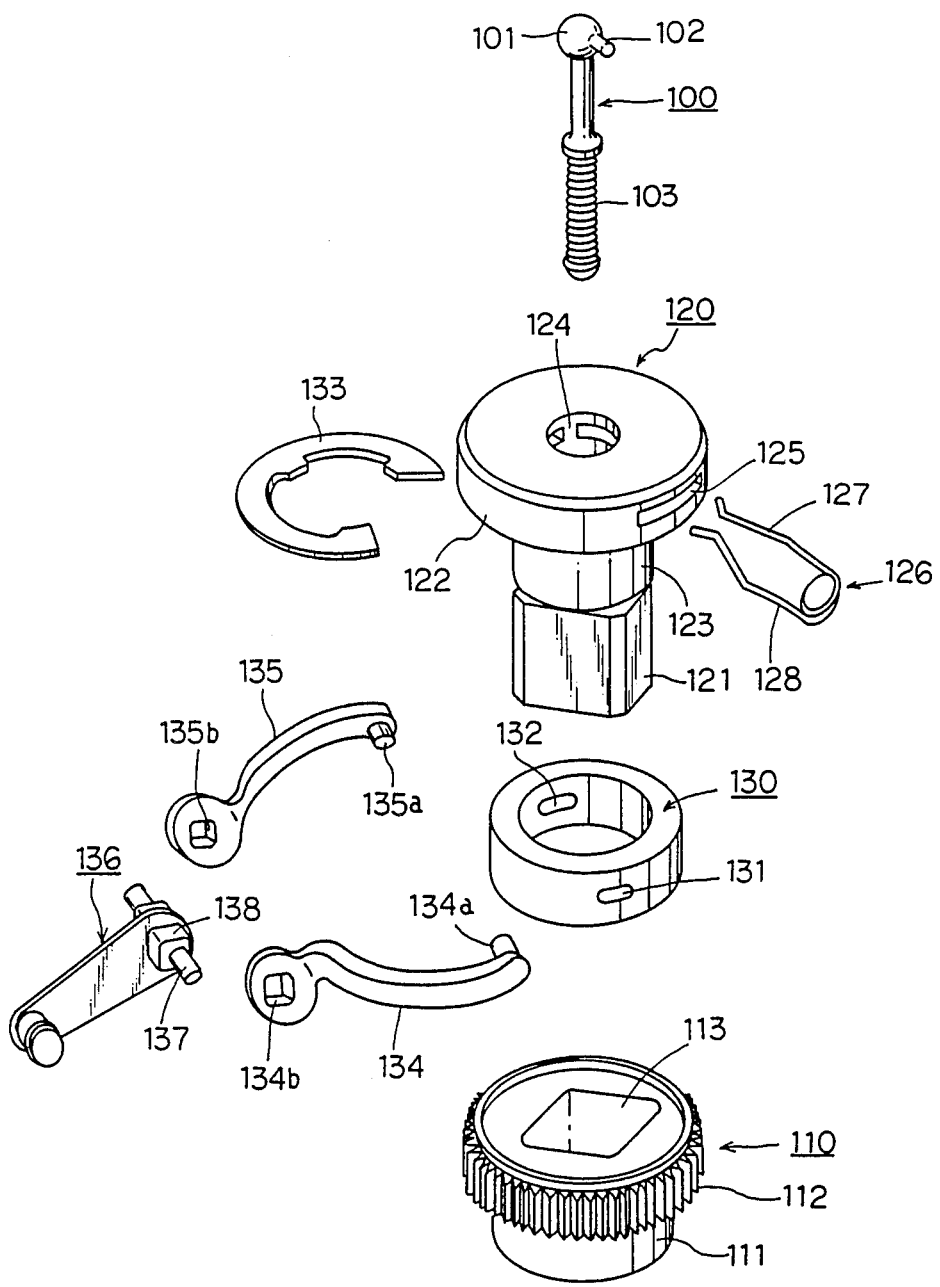
FIG. 6 is an exploded, perspective view showing a principal portion of the driving apparatus.

The ring 130 has a pair of circumferentially elongated, circumferentially opposite slits 131 and 132 engaging projections 134a and 135a of first link levers 134 and 135 for linking the ring 130 with a second linking flat-type lever 136 having at one end a shaft 137 perpendicularly extending therefrom, whereby the shaft 137 is rotatably supported by a supporting member 140 fixedly secured to the casing 3 as viewed in FIG. 5. In order to link the first linking levers 134 and 135 with the second linking lever 136, there are formed base portions 138 at the roots of the shaft 137, which engage the corresponding bore portions 134b and 135b by inserting therethrough.

A gear member 170 which is rotatably held on the casing 3 is, here in the embodiment, composed of a warm 171 at one end and a gear 172 at the other end, respectively, and the gear 172 of which is meshed with a pinion 161 provided on the output shaft of the second motor 160. A shaft 180 is rotatably held on a supporting wall 185 attached to or integrally formed with the casing 3, being connected to a gear 181 at one end and connected to a fourth linking lever 182 extending radially therefrom at the other end. Between the other end of the second linking lever 136 and the forward end of the fourth linking lever 182 is interposed a third linking lever 141, whereby the rotational motion of the second motor 160 is transmitted to the shaft 180 through the gear train 161, 171 and 181, and the fourth linking lever 182 is rotated clockwise or counterclockwise with respect to the shaft 180 in response to the rotation of the second motor 160. The rotational motion of the fourth linking lever 182 is converted through the third linking lever 141 to the reciprocative motion, thereby swinging the second linking lever 136 with respect to the shaft 137 swingably supported with respect to the fixed supporting member 140, thus resulting in the movement of the ring 130 and the second rotating member 120 upward or downward via the first linking lever 134 and 135. The second motor accordingly is able to make the second rotating member 120 move up and down, independent of the operation of the first motor 150. The foregoing linking mechanism described above, as illustrated by the solid line in FIG. 4, has its initial position, namely, the second rotating member 120 is stopped at the topmost position in normal state. The doe-dash line shows that the ring 130 is positioned at its lowest position.

Now, an automatic stop mechanism for stopping the second rotating member 120 at its initial position will be described with reference to FIGS. 2 and 5.

An insulation plate 190 is fixed to or integrally formed with the casing 3 such that the insulation plate 190 faces the supporting wall 185. On the surface of the insulation plate 190 there is provided a thin conductive layer of C-shape as a fixed electrode 191. A movable contact 183 is arranged on the back side of the gear 181 such that the movable contact 183 slides on the surface of the fixed electrode 191 when the gear 181 is rotated by the second motor 160. Another movable contact 184 is also provided on the same side on which the movable contact 183 is provided, and which engages another fixed contact, omitted for clarity in FIGS. 2 and 5, being electrically separated from the foregoing fixed contact 191 to apply the battery voltage to the movable contact 183, whereby when contact between the fixed and movable contacts 191 and 181 is made, electricity is supplied to the second motor 160, and when the contacts open, the current supply is stopped thus turning off the second motor.

Figure 3:
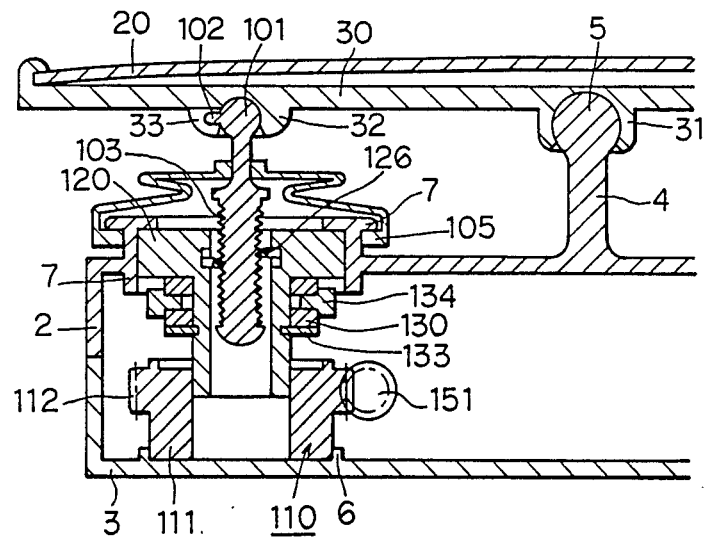
FIG. 3 is a sectional view taken along a line with III—III of FIG. 2.
Figure 4:
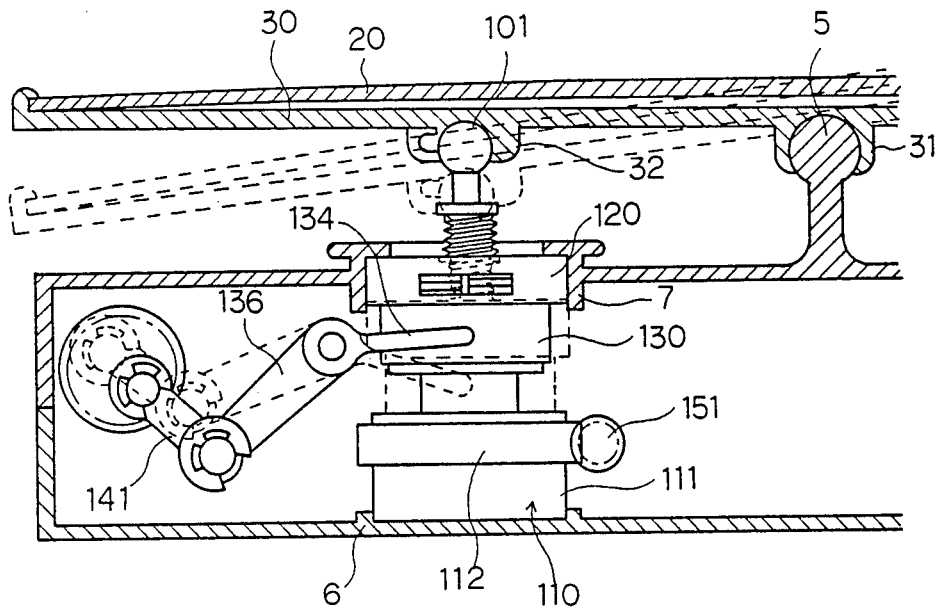
FIG. 4 is a sectional view taken along a line with IV—IV of FIG. 2.

By the way, in FIG. 3, a rubber cover 105 is attached to a circumferential, radially outwardly extending flange 7a of the cup-like bearing 7 to protect the apparatus from the rain and/or dust. The cover 105 may be made of other flexible materials.

Now, a control circuit for the above-described mirror driving apparatus will be explained in detail with reference to FIG. 7.

Figure 7:
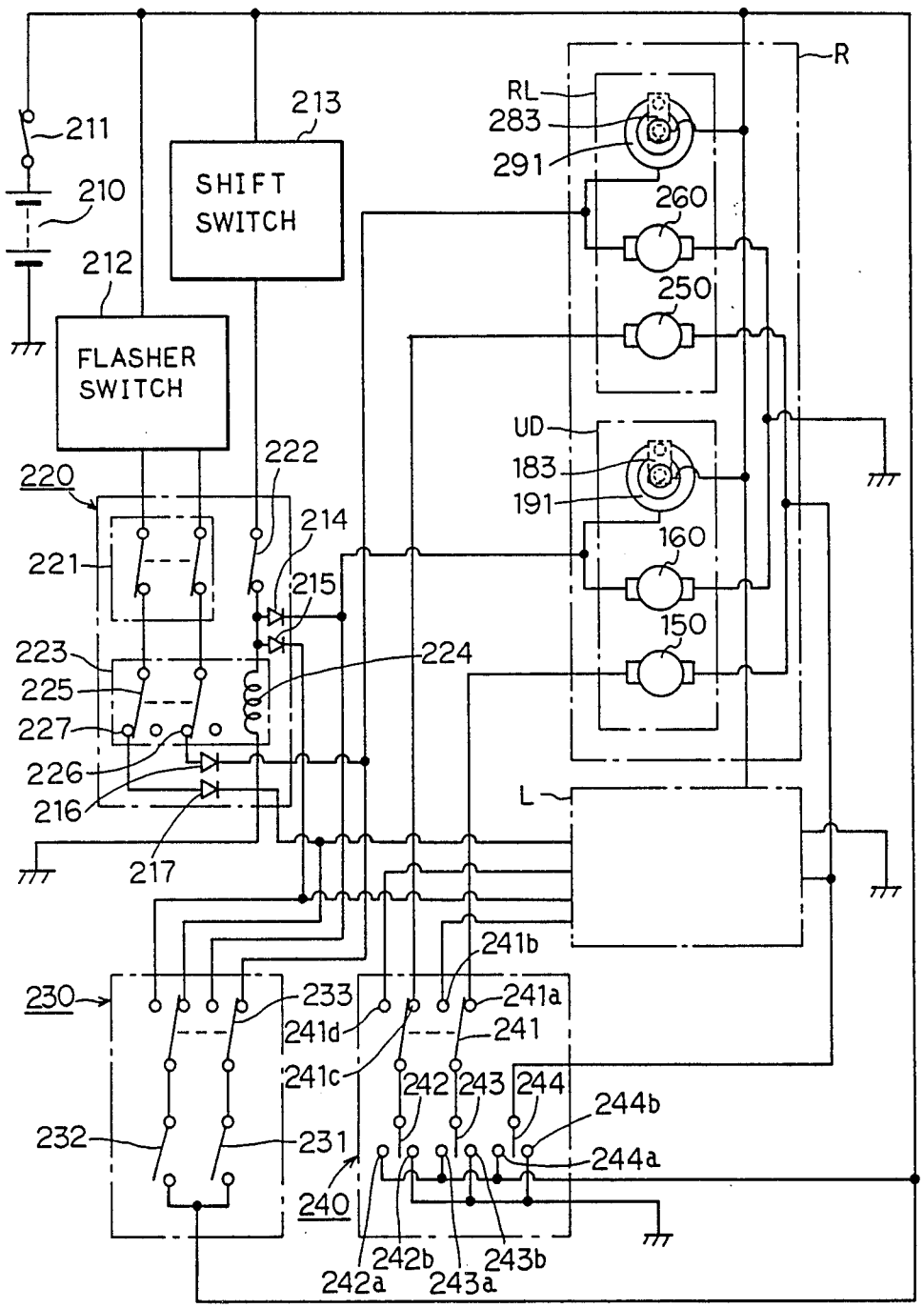
FIG. 7 is a control circuit for the driving apparatus shown in FIGS. 1 to 6.

In FIG. 7, a battery 210 mounted on a motor vehicle supplies electric power via an ignition switch 211 to the electric loads. R and L show schematic electric wiring diagrams for the foregoing driving apparatuses attached to the right- and the left sides of the motor vehicle, respectively, wherein RL and UD respectively designate driving portions for driving the mirror in the right-hand and left-hand directions and in the upward and downward directions. Here, the mirror driving apparatus for driving the left-side mirror of the motor vehicle is omitted for clarity.

A switch 220 for independently energizing the right-hand and the left-hand driving apparatus in a linkage operation of a flasher switch 212 or a shift switch 213 is manually opened and closed and includes first and second manual switches 221 and 222 respectively connected to the flasher switch 212 and the shift switch 213, and a magnet switch 223. The magnet switch 223 has an electromagnetic coil 224 connected to the second manual switch 222, and a pair of normally-closed movable contact 225 respectively connected to the first manual switch 221. With the switches 221 and 222 closed as shown in FIG. 7, the mirrors are driven in conjunction with the flasher switch 212 or the shift switch 213. In case that the flasher switch 212 and the shift switch 213 are simultaneously energized, the electromagnetic coil 224 urges the normally-closed movable contacts 225 to open so that this situation will give priority to the operation of the mirrors through the shift switch 213. One of the two terminals of the second motor 260 for inclining the right-hand mirror of the vehicle rightwardly and leftwardly is connected through a diode 216 to a fixed contact 226, and one of the two terminals of the second motor for inclining the left-hand mirror rightwardly and leftwardly, omitted here in FIG. 7, is connected through a diode 217 to a fixed contact 227. On the other hand, the second motors 160 for inclining the right-hand and the left-hand mirror upwardly and downwardly are respectively connected through diodes 214 and 215 to the manual switch 222. The other terminals of the foregoing motors 160 and 260 are grounded. The fixed electrodes or contacts 191 and 291 are connected to the foregoing terminals of the second motors 160 and 260, respectively, and the corresponding movable contacts 183 and 283 are connected to the positive terminal of the battery 210 through the ignition switch 211. A manual switch 230 is provided for controlling the right-hand side and the left-hand side mirrors independent of the situations of the flasher switch 212 and the shift switch 213 in which selection of the right-hand or the left-hand mirror is made by movable contacts 231 and 232, and selection of operation of inclining the mirror either upwardly and downwardly or rightwardly and leftwardly is made by movable contact 233. A manual switch 240 is for adjusting the mirror at a desired position and includes movable contacts 241 for selecting either the right-hand or the left-hand mirror, and movable contacts 242 to 244 for adjusting the right-hand and the left-hand mirror both upwardly and downwardly and rightwardly and leftwardly and selecting the rotational direction of the motors. Fixed contacts 241a to 241d of the manual switch 241 are connected to the respective motors, namely, the first motor 150 for adjusting the right-hand mirror in the upward and the downward direction, the first motor, not shown in the figure, for adjusting the left-hand mirror in the upward and the downward direction, the first motor 250 for adjusting the right-hand mirror in the rightward and the leftward direction, and the first motor, not shown in the figure, for adjusting the left-hand mirror in rightward and the leftward direction, the other ends of which motors are connected to the movable contact 244. Fixed contacts 242a, 243a and 244a are selectively connected by the respective movable contacts 242 to 244 and connected to the positive terminal of the battery 210, and the other fixed contacts 242b, 243b and 244b are grounded.

In operation with the arrangements described above, when the movable contacts 243 and 244 are engaged with the fixed contacts 243a and 244b, respectively, completing the motor driving path, so that the first motor 150 starts its rotation in one direction and the rotational motion of which is transmitted to the second rotating member 120 through the first rotating member 110, thus causing the first lever 100 to move up. Therefore, the right-hand mirror 20 is inclined in the upward direction with respect to the ball 5 and adjusted in a desired position. To the contrary, when the movable contact 243 and 244 are engaged with the fixed contacts 243b and 244a, respectively, completing the motor driving path with the polarity of the battery terminals reversed. Such reverse polarity drives the first motor 150 in the opposite direction and results in an adjustment of tilting angle of the right-hand mirror 20 in the downward direction. The mirror 20 in this way is adjusted at a desired position in the upward and downward directions by selectively connecting the movable contacts 243 and 244 to the respective fixed contacts. On the other hand, the inclination of the mirror 20 is adjusted at a desired position in the right-hand and left-hand directions, in the same manner, by selectively connecting the movable contacts 242 and 244 to the respective fixed contacts 242a, 242b, 244a and 244b.

When the vehicle moves back the shift switch 213 is activated and power is supplied to the second motors 160 through the second manual switch 222 and the diodes 214 and 215. Hence, the rotation of the second motor 160 is converted through the linking mechanism into the continuous reciprocative motions of the ring 130 in the upward and the downward direction, together with the second rotating member 120 and the first lever 100, thus causing the mirror 20 to repeat its swinging in the upward and downward directions, whereby the driver is able to confirm a wide rear field of view when the vehicle moves back. If the vehicle turns to the right or the left, or changes a driving lane, the second motor 260 is supplied with current to rotate by closure of the flasher switch 212, so that as in the same manner described above, a wider rear field of view is confirmed.

When the vehicle's movement in the backward direction is stopped the shift switch 213 is opened, so that power supplied to the second motor 160 therethrough is turned off. At this time, if the mirror 20 is not placed in the initial position the movable contact 183 is still engaged with the fixed electrode 191, current supply to the second motor 160 is continued through such automatic stop mechanism. Thereafter, when the mirror 20 comes to the initial position by rotation of the motor 160 the electrical connection between the movable contact 183 and the fixed electrode 191 is opened, whereby the current supply to the second motor 160 is finally restricted, thus causing the mirror 20 to stop at the initial position. In this connection, when the mirror 20 is inclined in the right-hand and left-hand directions the mirror 20 is driven to automatically stop at its initial position by the automatic stop mechanism as in the same way.

Although only one exemplary embodiment of this invention has been described in detail above, those skilled in the art will readily appreciate that many modifications are possible in the preferred embodiments without materially departing from the novel teachings and advantages of this invention. Accordingly, all such modifications are intended to be included within this invention as defined by the following claims.

What we claim is:

1. A side-mirror driving apparatus comprising:
 a casing;

a supporting shaft having a supporting portion at an end thereof and fixed to said casing;

a mirror swingably supported at said supporting shaft supporting portion;

at least one lever having a longitudinal axis disposed in said casing and swingably linked to a rear surface of said mirror at one end thereof; and at least one driving means drivingly connected to said lever for reciprocating said lever along with the longitudinal axis thereof so as to incline said mirror, wherein said driving means includes:

a first rotating member rotatably held on said casing;

a first motor for rotating said first rotating member;

a second rotating member rotatably and movably coupled to said casing in such a manner that said second rotating member reciprocates along with the longitudinal axis of said lever, said first rotating member being connected to said second rotating member in such a manner that the rotation of said first rotating member is transmitted to said second rotating member; a second motor;

linkage means drivingly so connected between said second rotating member and said second motor that the rotation of said second motor makes said second rotating member reciprocate along with the longitudinal axis of said lever;

driving connection means drivingly so connected between said lever and said second rotating member that at least one of the rotation and the reciprocation of said second rotating member makes said lever reciprocate along with the longitudinal axis of said lever; and a set position stopping mechanism, operated in response to the operation of said linkage means for deenergizing said second motor to stop said mirror at a desired position.

2. A side-mirror driving apparatus according to claim 1, wherein:

said second motor comprises a motor shaft and a worm provided on said motor shaft; and said linkage means comprises a train of gears, and a lever connected with one gear of said train of gears, said linkage means provided in such a manner that a gear other than said one gear of said train of gears is meshed with said worm of said second motor and said lever means is connected with said second rotating member, so that the rotation of said gear train is converted into reciprocation of said second rotating member along with the longitudinal axis of said lever.

3. A side-mirror driving apparatus according to claim 2, wherein:

said lever provides a worm screw portion thereon, and said driving connection means is fixed with said second rotating member, and said driving connection means rides along said worm screw portion of said lever so that at least one of the rotation and the reciprocation of said second rotating member makes said lever reciprocate along with the longitudinal axis of said lever.

4. A side-mirror driving apparatus according to claim 3, wherein:

said second rotating member has a longitudinal hole through which said lever extends and a radially-opened slot connecting said longitudinal hole to an outer surface of said rotating member, and said driving connection means further comprises an engaging pin having two parallell extending portions inserted into said radially-opened slot and substantially secured thereto, said extending portions being engaged with threads of said worm-screw portion of said lever.

5. Aside-mirror driving apparatus according to claim 2, wherein:

said linkage means comprises a ring member axially slidably and rotatably disposed with respect to said second rotating member between said first and second rotating members, said ring member being linked with an end of said lever means so that the operation of said lever means caused by the drive of said second motor through said gear train makes said ring member reciprocate, thus moving together said second rotating member and said lever in the same direction.

6. A side-mirror driving apparatus according to claim 2, wherein said set position stopping mechanism comprises:

a pair of movable contacts provided on a surface of said one gear at opposite surface from a surface on which said lever means connected;

an insulating plate provided close to said one gear in such a manner that said movable contacts face to said insulating plate;

a first fixed-countercontact provided on said insulating plate; and a second fixed-countercontact provided on said insulating plate and having no contact with said first fixed-countercontact, one of said movable contacts being always in contact with said second fixed-countercontact and another movable contact being in alternate contact with said first fixed-countercontact and a portion of said insulating plate.

* * * * *